United States Patent [19]

Shewchuk

[11] Patent Number: 4,674,907
[45] Date of Patent: Jun. 23, 1987

[54] COUPLING COMPONENT FOR BREAKAWAY POLE BASES

[76] Inventor: John Shewchuk, 645 Grierson Avenue, Winnipeg, Manitoba, Canada, R3T 2S3

[21] Appl. No.: 860,502

[22] Filed: May 7, 1986

[30] Foreign Application Priority Data

May 14, 1985 [CH] Switzerland ............................ 481530

[51] Int. Cl.⁴ ............................................. F16D 9/00
[52] U.S. Cl. ........................................... 403/2; 52/98; 52/292
[58] Field of Search ................. 403/2; 52/98, 99, 296, 52/292

[56]  References Cited

U.S. PATENT DOCUMENTS 3,623,286 11/1971 Parduhu ................................. 52/98
3,630,474 12/1971 Minor ..................................... 52/98
3,837,752 9/1974 Shewchuk ............................. 403/2
3,951,556 4/1976 Strizki ..................................... 403/2
4,007,564 2/1977 Chisholm ............................ 403/2 X

FOREIGN PATENT DOCUMENTS 973677 9/1975 Canada .................................... 403/2

Primary Examiner—Andrew V. Kundrat
Attorney, Agent, or Firm—Stanley G. Ade

[57] ABSTRACT

A frangible coupling assembly for breakaway pole bases has a pair of spaced and parallel plate with a plurality of struts extending therebetween and being situated between a pole base and a supporting base. Each strut is of an elongated cross-section with the longitudinal axis of the struts lying on the perimeter of a circle concentric with the central vertical axis of the plates thereby providing an increased resistance to torsional loads and at the same time relatively lower resistance to lateral force.

19 Claims, 3 Drawing Figures

4,674,907

COUPLING COMPONENT FOR BREAKAWAY POLE BASES

BACKGROUND OF THE INVENTION

This invention relates to new and useful improvements in coupling assemblies for breakaway pole bases.

In my previous Canadian Pat. No. 973,677 and U.S. Pat. No. 3,837,752, (incorporated by reference) I disclosed a coupling for the attachment of poles to a base such as a concrete base and adapted primarily for use with free standing utility poles such as roadside lighting supports.

The coupling disclosed in the above patents includes a plurality of breakaway or frangible coupling bolts attachable to existing bolts extended upwardly from the conventional concrete base and adapted to receive the base plate of the utility pole. These couplers are designed to fracture in the event that an impact is received by the pole along a line substantially parallel to the base such as would be the case if a vehicle struck the pole. Such lateral impact loads produce bending in the couplers. Hence, the impact resistance of the couplers is determined by their design bending strength.

It is desirable to have low bending strength in order to serve the purpose of frangible pole bases.

At the same time, normal operating wind and static loads produce primarily axial loads in the couplers. Hence the normal operating strength of the couplers is determined by their design axial strength. However, in poles with long unbalanced davit arms, normal wind loads produce torsion in the pole and, hence, bending in the couplers. Thus, in this case, the normal operating strength is limited by the bending strength of the individual couplers in which, as noted above, it is desirable to have low bending strength.

SUMMARY OF THE INVENTION

The present invention overcomes this and other disadvantages by providing a coupling assembly which has increased resistance to torsional loads while maintaining the other desirable characteristics of frangible bases, yet at the same time has relatively low resistance to lateral force.

This is accomplished by providing upper and lower plates maintained in spaced apart relationship by a plurality of vertically extending struts situated concentrically around the vertical axis of the coupler assembly so that the assembly has maximum resistance to torsional load about the vertical axis thereof because said torsional load is resisted by each strut in bending about the transverse cross sectional axis thereof which is the axis of the maximum moment of inertia of the strut and minimal resistance to horizontal load at the upper plate of the assembly, resulting from impact near the base of the pole because such horizontal load is resisted in bending by each strut to an extent depending upon the orientation of the horizontal load and the cross sectional axes of each strut ranging from maximum resistance in the strut whose transverse axis is most nearly perpendicular to the direction of the horizontal force, to minimum resistance in the strut whose longitudinal axis is most nearly perpendicular to the direction of the horizontal force.

Another advantage of the invention is that it can readily be cast in one piece or in a plurality of pieces and can, if desired, be designed so that it can be installed readily with existing structures, it being understood that it can also of course be installed with new structures at the time of erection.

The further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Proceeding therefore to describe the invention in detail, it should be explained that there are three types of load resistances which should be considered in a breakaway base for a utility pole or the like.

Figure 3:
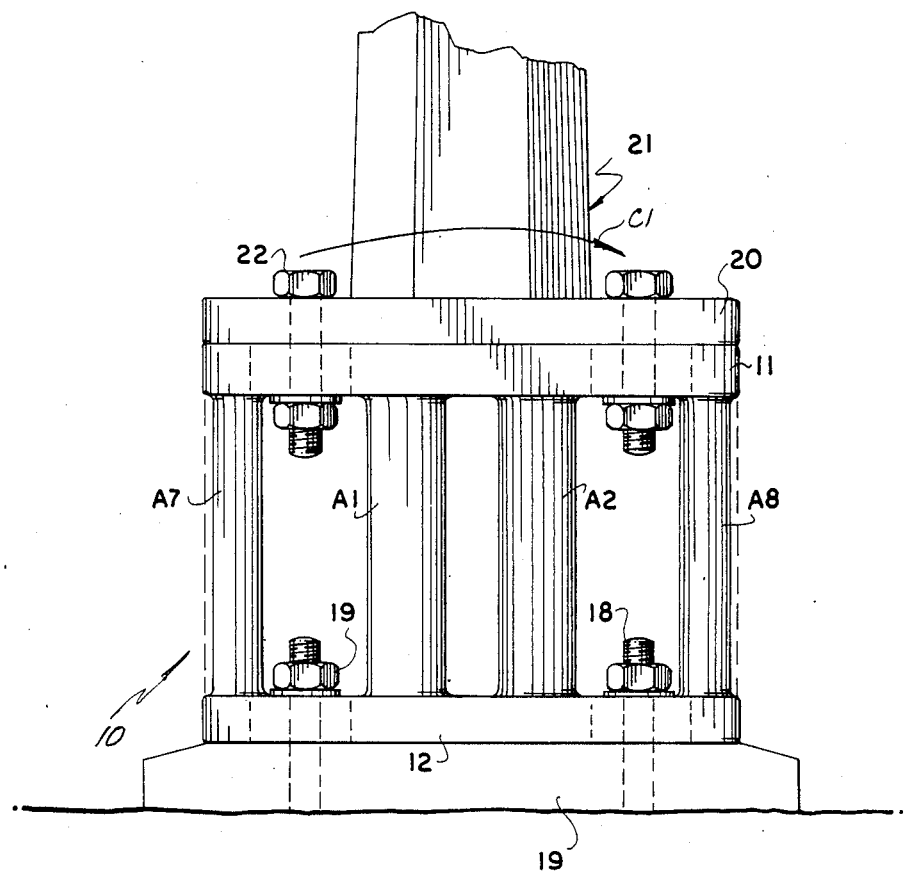
FIG. 3 is a fragmentary side elevation of the invention shown installed below the base of a utility pole assembly.

(1) Resistance to bending moment about a horizontal neutral axis through the base as shown in FIG. 3 and which is caused by wind loading upon the hole or by offset davit arms and attachments.

Figure 2:
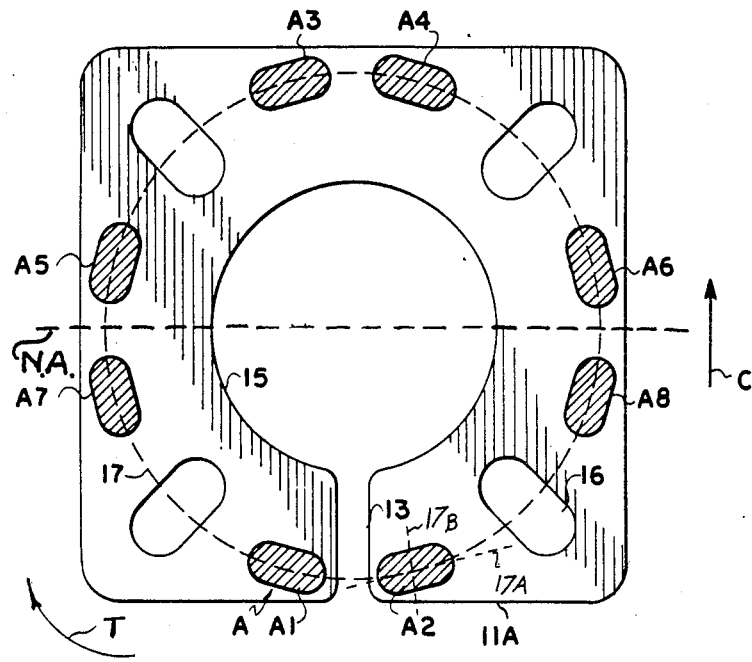
FIG. 2 is a horizontal cross sectional view along the line 2—2 of FIG. 1.
Figure 1:
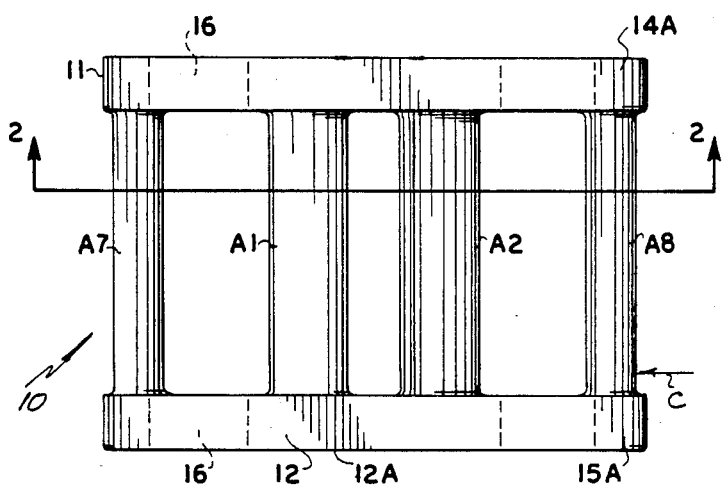
FIG. 1 is a side elevation of the coupler assembly.

(2) Resistance to torsional moment about a vertical centroidal axis through the base which is shown in FIG. 2 and which is caused by wind loading on an offset davit arm and attachments.

(3) Resistance to fracture from a lateral in the horizontal plane of the base and above the base as shown in FIG. 3.

Insofar as items 1 and 2 are concerned, it is desirable that the resistance to bending moment be relatively high and that the resistance to torsional forces also be relatively high.

However, with a breakaway base, item 3 requires that the resistance to lateral force be relatively low.

Referring next to the drawings, the coupling assembly is collectively designated 10 and consists of an upper plate 11 and a lower plate 12, said plates being maintained in spaced and parallel relationship one with the other by a plurality of struts or couplers designated "A" and identified specifically as A1 through A8. The number of struts used depends upon design characteristics.

It is preferable that the entire coupler assembly be cast in one piece from iron, steel or aluminum or any other material of suitable characteristics but it will be appreciated that the assembly could be made in two or four segments depending upon design parameters.

It will also be appreciated that a slot such as 13 may be formed anywhere between a central aperture 15 within the upper and lower plates 11 and 12, and the outer perimeter 11A and 12A of these plates. This enables the assembly to be engaged between an existing utility pole and the base thereof without disconnecting the power lines which normally will run upwardly from the base and through the apertures 15 of the two plates.

Formed in each of the plates is a plurality of preferably elongated apertures 16 for attachment of the coupling assembly to the utility pole base and the supporting base as will hereinafter be described.

The struts "A" are designed to lie on a concentric circle 17 shown in phantom in FIG. 2 and it will be noted that each of these struts A1 through A8 is of a rectangular cross sectional configuration preferably with semi-circular ends, with the longitudinal axes of the struts lying along the circumference of the circle 17 shown in dotted line.

FIG. 3 shows the method of attachment in which the existing anchor bolts 18 extend upwardly from a conventional concrete base 19 and engage through the apertures 16 within the lower plate 12 of the coupler assembly so that nuts and washers 19 may be engaged upon the studs after the coupler assembly is installed and tightened downwardly to secure the coupler assembly firmly to the base.

The base plate 20 of the utility pole assembly 21 is then engaged upon the upper plate 11 with the apertures in the pole base plate 20 aligning with the apertures 16 in the upper plate whereupon nut and bolt assemblies 22 may be engaged through the apertures thus clamping the utility pole assembly firmly to the upper plate 11 of the coupler assembly. Alternatively, these apertures may be threaded to receive the bolts thus eliminating the nuts.

The drawings show the three types of load resistances to be considered and reference should first be made to FIG. 2.

Dealing first with the resistance to bending moment about a horizontal neutral axis (N.A. in FIG. 2) through the base, all of the struts or vertical members are in tension or compression so that maximum strength is realized, irrespective of the orientation of the cross section.

If the wind force is in the direction of arrow C of FIG. 2, then struts A1, A2, A7 and A8 are tension and struts A3, A4, A5 and A6 are in compression with arrow $C_1$ of FIG. 3 indicating the bending moment due to wind load.

If the load is torsional around the vertical axis of the assembly as shown by arrow T in FIG. 2, then it will be appreciated that the resistance to torsion will be high as all of the struts or vertical members "A" are oriented so as to give the highest possible resistance to bending in the struts induced by all of the struts "A" are situated around the circle 17 substantially upon which lie the longitudinal cross sectional axes 17a of all of these struts as clearly shown in FIG. 2, thereby causing bending in each strut about the transverse cross sectional axis 17B thereof which is in the axis of the maximum moment of inertia and hence, of the maximum resistance to bending.

By contrast, if a lateral impact occurs adjacent and alone the base of the utility pole, once again in the direction of arrow C, then struts A1, A2, A3 and A4 are the weakest in bending of the eight struts illustrated with struts A5, A6, A7 and A8 having less bending resistance than with a torsional load because of the angle of inclination of the cross sectional longitudinal axes of these struts relative to the direction of impact as indicated by arrow C.

Summarizing, there is provided a pole-to-base coupling device for use on free standing utility poles or the like which are normally fastened to a base with upwardly extending anchor bolts.

The device is preferably a single casting comprising upper and lower planar plates joined by rectangular cross sectioned vertical members or struts. The upper and lower plates correspond in geometry to the pole base plate.

The vertical members are spaced approximately symmetrically around a circle centered about the vertical axis of the coupling device and the individual supports or struts are so arranged that their longitudinal cross sectional dimension falls on the circle. This gives the best resistance to torsional wind loads and the least resistance to horizontal impact.

I claim:

1. A frangible coupling assembly for breakaway pole bases comprising in combination upper and lower plates and a plurality of vertically situated struts extending between said plates spaced from the central vertical axis thereof, thereby maintaining the plates in spaced apart parallel relationship one with the other, said struts each having a transverse cross-sectional axis and a longitudinal axis with the longitudinal cross-sectional axis being longer than the transverse axis, the longitudinal cross-sectional axes of the struts lying circumferentially relative to said central vertical axis of said plates thereby providing increased resistance to torsional load and relatively low resistance to lateral force.

2. The assembly according to claim 1 in which said struts are substantially symmetrically spaced around the circumference of a common circle adjacent to the outer boundaries of said plates.

3. The assembly according to claim 1 in which said coupling assembly is cast in one piece.

4. The assembly according to claim 2 in which said coupling assembly is cast in one piece.

5. The assembly according to claim 1 in which the coupling assembly is formed in a plurality of pieces.

6. The assembly according to claim 2 in which the coupling assembly is formed in a plurality of pieces.

7. The assembly according to claim 1 in which said struts, when viewed in cross section, are elongated with spaced and parallel sides and substantially semi-circular ends.

8. The assembly according to claim 4 in which said struts, when viewed in cross section, are elongated with spaced and parallel sides and substantially semi-circular ends.

9. The assembly according to claim 1 in which said plates include apertures formed therethrough for attachment between a pole base and a mounting base.

10. The assembly according to claim 5 in which said plates include apertures formed therethrough for attachment between a pole base and a mounting base.

11. The assembly according to claim 1 which includes a central aperture through said plates and a slot extending from the edges of said plates to said central aperture whereby said assembly can be engaged over the power cable of a utility pole and inserted between said utility pole base and the mountain base therefor.

12. The assembly according to claim 4 which includes a central aperture through said plates and a slot extending from the edges of said plates to said central aperture whereby said assembly can be engaged over the power cable of a utility pole and inserted between said utility pole base and the mounting base therefor.

13. The assembly according to claim 7 which includes a central aperture through said plates and a slot extending from the edges of said plates to said central aperture whereby said assembly can be engaged over the power cable of a utility pole and inserted between said utility pole base and the mounting base therefor.

14. The assembly according to claim 9 which includes a central aperture through said plates and a slot extending from the edges of said plates to said central aperture whereby said assembly can be engaged over the power cable of a utility pole and inserted between said utility pole base and the mounting base therefor.

15. The assembly according to claim 1 which includes eight of said struts, one situated upon each side of and adjacent each end of a first transverse axis and one situated upon each side of and adjacent each end of a second transverse axis lying perpendicular to said first axis.

16. The assembly according to claim 4 which includes eight of said struts, one situated upon each side of and adjacent each end of a first transverse axis and one situated upon each side of and adjacent each end of a second transverse axis lying perpendicular to said first axis.

17. The assembly according to claim 7 which includes eight of said struts, one situated upon each side of and adjacent each end of a first transverse axis and one situated upon each side of and adjacent each end of a second transverse axis lying perpendicular to said first axis.

18. The assembly according to claim 9 which includes eight of said struts, one situated upon each side of and adjacent each end of a first transverse axis and one situated upon each side of and adjacent each end of a second transverse axis lying perpendicular to said first axis.

19. The assembly according to claim 11 which includes eight of said struts, one situated upon each side of and adjacent each end of a first transverse axis and one situated upon each side of and adjacent each end of a second transverse axis lying perpendicular to said first axis.

* * * * *

UNITED STATES PATENT AND TRADEMARK OFFICE
CERTIFICATE OF CORRECTION

PATENT NO. : 4,674,907

DATED : June 23, 1987

INVENTOR(S) : John Shewchuk

It is certified that error appears in the above-identified patent and that said Letters Patent is hereby corrected as shown below:

Title page:

[30] Foreign Application Priority Data    should read

-- May 15, 1985  [CA]  Canada....................481530 --.

Signed and Sealed this

Third Day of May, 1988

Attest:

DONALD J. QUIGG

*Attesting Officer*    *Commissioner of Patents and Trademarks*